United States Patent [19]
Rosen

[11] 3,959,703
[45] May 25, 1976

[54] SPEED CONTROL FOR PUMP OF FILLING MACHINES

[76] Inventor: Sidney Rosen, 4119-27 Fordleigh Road, Baltimore, Md. 21215

[22] Filed: Dec. 24, 1974

[21] Appl. No.: 536,102

[52] U.S. Cl. ............................... 318/305; 318/164; 318/348; 318/466; 141/392; 222/63; 417/415
[51] Int. Cl.² ........................................ H02P 7/36
[58] Field of Search ............ 318/11, 164, 302, 305, 318/306, 309, 330, 333, 336, 342, 346, 348, 349, 442, 466, 509; 141/392; 222/63; 417/415

[56] References Cited
UNITED STATES PATENTS

| | | | |
|---|---|---|---|
| 2,537,603 | 1/1951 | Prangley | 318/348 X |
| 3,215,919 | 11/1965 | Holzer | 318/349 |
| 3,288,933 | 11/1966 | Beeston | 318/164 |
| 3,351,836 | 11/1967 | Kearns | 318/466 X |
| 3,566,238 | 2/1971 | Akiyama | 318/349 X |
| 3,881,144 | 4/1975 | Kikuchi | 318/466 |

Primary Examiner—Gene Z. Rubinson
Attorney, Agent, or Firm—Craig & Antonelli

[57] ABSTRACT

A pump speed control for filling machines in which the rotational speed of the pump is varied between its intake stroke and the discharge stroke by selectively controlling the speed of the driving motor as a function of the rotational position of the output shaft of the driving motor.

15 Claims, 1 Drawing Figure

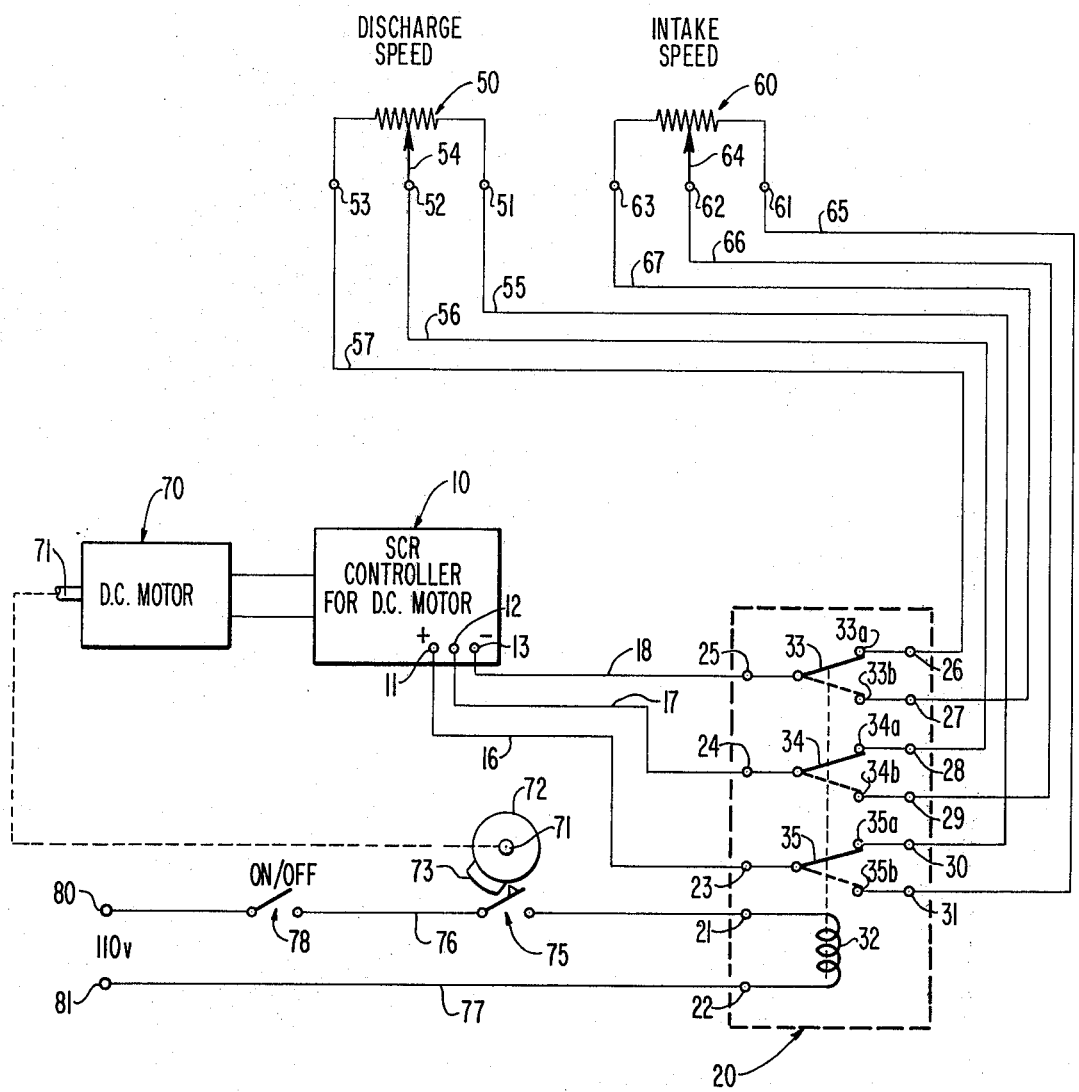

SPEED CONTROL FOR PUMP OF FILLING MACHINES

The present invention relates to a speed control for a pump, and more particularly to a pump dual speed control for filling machines.

Various types of filling machines are known in the prior art which fill bottles, vials, and similar containers with various products such as liquids, powders, etc. These prior art filling machines normally use one or several pumps driven at a constant speed from an electric motor or the like so that the pumps are driven at the same speed during the intake stroke and the discharge stroke. For example, my prior U.S. Pat. No. 2,807,213 represents a filling machine of the type in question which is controlled, for example, as described in my prior U.S. Pat. 3,067,786 or in my prior U.S. Pat. No. 3,237,661. Though the drive motor could be manually set to different speeds within certain limits, the pump shafts were always driven in these prior art machines at the constant, adjusted speed so that the pumps rotated at the same speed during intake and discharge.

Such prior art machines and controls are quite satisfactory for the majority of applications in which no serious limitations exist as regards the filling of the containers and thus the speed of the driving motor and therewith of the pumps can be set relatively high in adaptation to the requirements of the particular type of product and the shape of the container. However, if, for example, so-called shaker-top bottles, i.e., bottles with a small neck were to be filled with a liquid, the speed of the filling machine had to be slowed down in the prior filling machines to the proper speed for the discharge stroke limited by the speed at which the container can be filled, which in turn resulted in a corresponding reduction of the speed of the intake stroke. As a result thereof, the overall speed of production had to be considerably reduced.

It is the aim of the present invention to provide a filling machine, and more particularly a speed control for the pump or pumps of such filling machines which avoids the aforementioned shortcomings and drawbacks.

The underlying problems are solved according to the present invention in that the speed control of the pump is such that the speed of the intake stroke and of the discharge stroke can be adjusted separately so that the intake strokes and discharge strokes take place at different, preselected speeds. This means in practice that, if, for example, a small-neck container is filled, the small size of the opening of the container would have limited the discharge rate in the prior art filling machines to 4 fills per minute, i.e., it would require a total of fifteen seconds to aspirate and discharge the product. In the prior art filling machines, these fifteen seconds would have been equally divided between intake and discharge stroke, so that 7.5 seconds would have been allocated to the intake stroke and 7.5 seconds to the discharge stroke. In the prior art filling machines, the intake or aspirating stroke would therefore be limited by the slow discharge which had to be adopted in view of the inability to fill the product more rapidly into the small-neck container. The dual speed control according to the present invention which will permit the speed of the aspirating or intake stroke to be regulated separately from the discharge stroke, will permit that in the aforementioned example, the intake or aspirating time can be reduced from 7.5 seconds to about 2 seconds, whence the total cycle time would be reduced to 9.5 seconds, i.e., 7.5 seconds of discharge time and 2 seconds for intake time. This would increase the production rate of the filling machine per nozzle to 6.31 fills per minute, thereby representing an increase of 57.8 percent which is a significant increase.

The speed control of the present invention uses a conventional S.C.R. D.C. motor controller which, as is known, is operable to control the operation of the D.C. motor to maintain its speed substantially constant, regardless of variations in the load. Such S.C.R. controllers permit an adjustment of the speed of the motor by varying the armature voltage thereof by the use of a manually adjustable potentiometer. According to the present invention, two potentiometers are thereby provided, one for the intake speed setting and one for the discharge speed setting which are alternately connected with the D.C. motor control in dependence on the closing of a switch actuated by a cam on the output shaft of the motor which selectively closes an energizing circuit for the control winding of a three-pole double-throw relay which, in the de-energized condition, connects the discharge speed potentiometer with the controller and in the energized condition, connects the intake speed potentiometer with the controller. The three-pole double-throw relay may be a commercial plug-in relay, thereby simplifying the manufacture and assembly as well as repair in case of damage to the relay.

The intake speed and the discharge speed are thereby separately controllable as a function of the setting of the respective potentiometers so that any desired speed can be established for the intake strokes and the discharge strokes, respectively. This arrangement will not only permit an appropriate control but also ensures great flexibility in the use of the filling machine as these controls will permit the adaptation of the filling machine to containers of different sizes and shapes, i.e., with different sizes of filling openings, and to different types of products, for example, more or less viscous liquids, foaming liquids, etc.

Accordingly, it is an object of the present invention to provide a filling machine and control thereof which obviates by simple means the aforementioned shortcomings and drawbacks encountered in the prior art.

Another object of the present invention resides in a speed control for the pump of a filling machine which permits a significant increase in the production rate even though the filling rate is relatively slow due to the particular shape of the filling opening of the container and/or the type of product with which the container is to be filled.

A further object of the present invention resides in a dual speed control for the pumps of filling machines which obviates the disadvantage of a slow production rate of the machine, due to the slow filling rate conditioned in a given case on limitations imposed by the characteristics of the product and/or the fill-in opening of the container.

A still further object of the present invention resides in a dual speed control for the pumps of filling machines of the type described above which is simple in construction, easy to install and assemble and which can be repaired in a relatively simple manner.

Still another object of the present invention resides in a control system for filling machines of the type described above which offers great flexibility and versatility in its application to different containers and different products.

Another object of the present invention resides in a dual speed control for the pumps of filling machines which can also be readily installed into already existing machines.

These and further objects, features and advantages of the present invention will become more apparent from the following description when taken in connection with the accompanying drawing which shows, for purposes of illustration only, one embodiment in accordance with the present invention, and wherein:

The single FIGURE is a schematic wiring diagram of a pump speed control for filling machines in accordance with the present invention.

Referring now to the single FIGURE of the drawing, the controller for the D.C. motor which may be a conventional S.C.R. controller manufactured, for example, by the G. K. Heller Co. is generally designated therein by reference numeral 10 and includes, inter alia, three terminals 11, 12 and 13 for externally adjusting the D.C. voltage to be applied to the armature of the D.C. motor 70, as controlled by the controller 10. The D.C. motor 70 may thereby be a permanent magnet D.C. motor or a shunt D.C. motor. A D.C. reference voltage, derived from the controller 10, is applied across the terminals 11 and 13 to be connected across the outer terminals of a potentiometer, while terminal 12 represents the input terminal to which is applied the predetermined, adjusted voltage determining the speed of the motor, as obtained from the adjustable arm of the potentiometer.

A three-pole double-throw relay generally designated by reference numeral 20, which may be of the plug-in type, includes terminals 21 through 31. Terminals 21 and 22 are thereby connected on the inside of the relay 20 with the energizing winding 32 thereof while terminals 23, 24 and 25 are connected with the movable double-throw contact members 35, 34 and 33, respectively, which in the de-energized condition of the coil 32 are in contact with the fixed contact members 35a, 34a and 33a while they are in contact with the other set of fixed contact members 35b, 34b and 33b when the coil 32 is energized. The fixed contact members 33a, 33b, 34a, 34b, 35a, and 35b are connected, respectively, with the terminals 26, 27, 28, 29, 30, and 31 of the three-pole double throw relay 20. Terminals 11, 12 and 13 of the controller 10 are thereby connected with terminals 23, 24 and 25 of relay 20 by way of lines 16, 17 and 18.

Two potentiometers generally designated by reference numerals 50 and 60 are provided, whereby potentiometer 50 sets the discharge speed and potentiometer 60 the intake speed of the D.C. motor 70. The potentiometer 50 is connected at its terminal 51 by way of line 55 with the terminal 30 of the relay 20, while the terminals 52 and 53 of the potentiometer 50 are connected by way of lines 56 and 57 with the terminals 28 and 26 of the relay 20. The adjustable potentiometer arm 54 is thereby connected with terminal 52.

The potentiometer 60, like potentiometer 50, includes terminals 61, 62 and 63 which are connected by way of lines 65, 66 and 67, respectively, with terminals 31, 29 and 27 of the relay 20. The adjustable potentiometer arm 64 is connected thereby with terminal 62.

The D.C. motor 70 drives its output shaft 71 which includes a cam member 72 suitably mounted thereon for rotation in unison therewith. The cam member 72 includes a raised cam portion 73 which cooperates with a switch such as a microswitch generally designated by reference numeral 75 to close the latter as long as the cam portion 73 is in engagement with the switch 75. The switch 75 is interconnected in the energizing circuit 76 and 77 of the coil 32, which is connected accordingly with terminals 21 and 22 of the relay 20. The energizing circuit 76 and 77 additionally includes a conventional on-off switch 78 to apply, for example, a line voltage of 110 volts A.C. from terminals 80 and 81 to the terminals 21 and 22 of the energizing coil 32.

IN OPERATION

The two potentiometers 50 and 60 are adjusted to the desired speeds for discharge and intake so that, for example, in the aforementioned example, the discharge stroke takes about 7.5 seconds while the intake stroke takes about 2 seconds. Upon closing of the switch 78, which may be a multi-throw switch simultaneously causing energization of controller 10 and thus of motor 70, relay 20 remains de-energized as long as the raised cam portion 73 does not close the switch 75 during rotation of the output shaft 71 and therefore electrically connects the potentiometer 50 with the terminals 11–13 of the D.C. controller 10 by way of the movable contact members 33, 34 and 35 which are now in the full line position so that the voltage adjusted by the setting of the potentiometer arm 54 appears at terminal 12, which at that time determines the relatively slower discharge speed of the D.C. motor 70, as regulated by the controller 10. As soon as the output shaft 71 of the motor 70 comes to a rotational position at which the cam portion 73 closes the microswitch 75, the winding 32 of the relay 20 will be energized thereby shifting the shiftable contact members 33, 34 and 35 into the position indicated in dash lines so that now the potentiometer 60 is connected with the terminals 11–13, whence the voltage as determined by the setting of the potentiometer arm 64 is applied to the terminal 12 which then controls the relatively faster intake speed. The voltage determined by the setting of the potentiometer arm 64 which in the aforementioned example will provide an intake stroke of about 2 seconds, continues to be applied to the terminal 12 until the output shaft 71 rotates to such angular position that the cam portion 73 has passed the switch 75 at the end of the intake stroke so that the latter now again opens whereby the energizing winding 32 of relay 20 becomes de-energized and the movable contact members 33, 34 and 35 again assume their position indicated in full line in the drawing. At this point, the voltage as determined by the setting of the potentiometer arm 54 is again applied to the terminal 12 whence the relatively slower discharge speed with a discharge stroke of about 7.5 seconds in the above-described example will again be established for the output shaft 71 of the D.C. motor 70 for the next filling operation.

While I have shown and described only one embodiment in accordance with the present invention, it is understood that the same is not limited thereto but is susceptible of numerous changes and modifications as known to those skilled in the art. For example, in lieu of a three-pole double-throw relay 20 and a single switch 75 actuated by a single cam portion 73, it is also possible to provide two separate cams on the shaft 71 which actuate two separate switches which in turn will control the energization and deenergization of two separate relays interconnecting the respective discharge speed and intake speed potentiometers with the controller 10.

Accordingly, I do not wish to be limited to the details shown and described herein but intend to cover all such changes and modifications as are encompassed by the scope of the appended claims.

I claim:

1. A control device for a filling machine operable to fill containers with a product by the use of pump means having intake and discharge strokes and including pump shaft means, characterized by drive means for driving the pump shaft means, and control means for selectively controlling the speed of the drive means in dependence on the angular position of the pump shaft means so that the speed of the intake stroke is greater than the speed of the discharge stroke of said pump means.

2. A device according to claim 1, characterized in that said control means includes first and second adjusting means for predetermining the respective speed of the intake stroke and discharge stroke, and means for selectively applying a control magnitude to said control means as a function of the setting of the respective adjusting means.

3. A device according to claim 2, wherein said adjusting means are potentiometers having movable potentiometer arms for preselecting the predetermined speed of the pump shaft means during intake and discharge stroke.

4. A device according to claim 3, wherein said drive means includes an electric motor, and wherein said control means includes an electric motor controller means and relay means for selectively operatively connecting said adjusting means with said controller means in dependence on the angular position of at least one of the output shaft of the electric motor and the pump shaft means.

5. A device according to claim 4, wherein said relay means includes energizing winding means, an energizing circuit for said winding means, and switch means adapted to be selectively closed in dependence on the position of the pump shaft means.

6. A device according to claim 5, characterized in that said relay means is a three-pole double-throw relay.

7. A device according to claim 5, characterized in that said relay means consists of two two-pole double-throw relay means, each selectively energized in dependence of the position of said pump shaft means.

8. A device according to claim 5, in which the relay means includes a control winding, characterized in that said output shaft includes cam means operable to selectively close a switch means in the energizing circuit of the control winding of said relay means.

9. A device according to claim 2, wherein said control means includes motor controller means and relay means for selectively operatively connecting said adjusting means with said controller means in dependence on the angular position of the pump shaft means.

10. A device according to claim 9, wherein said relay means includes energizing winding means, an energizing circuit for said winding means, and switch means adapted to be selectively closed in dependence on the position of the pump shaft means.

11. A device according to claim 9, characterized in that said relay means is a three-pole double-throw relay.

12. A device according to claim 9, characterized in that said relay means consists of two two-pole double-throw relay means, each selectively energized in dependence of the position of said pump shaft means.

13. A device according to claim 4, in which the relay means includes a control winding, characterized in that said output shaft includes cam means operable to selectively close a switch means in the energizing circuit of the control winding of said relay means.

14. A method for operating a filling machine for filling containers with a product by the use of at least one pump connected with a discharge nozzle, said pump having an intake stroke and a discharge stroke, comprising the steps of operating said pump at a first speed during each intake stroke and thereafter operating the pump at a second speed during each discharge stroke following a respective intake stroke, with the second speed being slower than the first speed.

15. A method according to claim 14, further comprising the step of preselecting the respective intake and discharge speed of the intake stroke and discharge stroke of the pump so as to match the discharge stroke speed to the requirements imposed by the inlet opening of the container and the product which is to be filled into the container and to speed up the intake stroke in relation to the discharge stroke speed to the extent permitted by said product.

\* \* \* \* \*